US010073617B2

(12) United States Patent
Morton et al.

(10) Patent No.: US 10,073,617 B2
(45) Date of Patent: Sep. 11, 2018

(54) TOUCHSCREEN PRECISE POINTING GESTURE

(71) Applicant: Onshape Inc., Cambridge, MA (US)

(72) Inventors: Michael Morton, Lyme, NH (US); Andrew John Morris, Linton (GB); Rammohan Vangapalli, Winter Springs, FL (US)

(73) Assignee: Onshape Inc., Cambridge, MA (US)

( * ) Notice: Subject to any disclaimer, the term of this patent is extended or adjusted under 35 U.S.C. 154(b) by 0 days.

(21) Appl. No.: 15/599,913

(22) Filed: May 19, 2017

(65) Prior Publication Data
US 2017/0336966 A1   Nov. 23, 2017

Related U.S. Application Data

(60) Provisional application No. 62/338,607, filed on May 19, 2016.

(51) Int. Cl.
G06F 3/00      (2006.01)
G06F 3/0488    (2013.01)
G06F 3/0481    (2013.01)

(52) U.S. Cl.
CPC ...... G06F 3/04883 (2013.01); G06F 3/04812 (2013.01)

(58) Field of Classification Search
CPC .................. G06F 3/04883; G06F 3/04812
See application file for complete search history.

(56) References Cited

U.S. PATENT DOCUMENTS

| 5,327,161 A | 7/1994 | Logan et al. |
| 5,543,591 A | 8/1996 | Gillespie et al. |
| 6,473,069 B1 | 10/2002 | Gerpheide |
| 8,248,384 B2 | 8/2012 | Zhang et al. |
| 8,334,867 B1 * | 12/2012 | Davidson ............ G06F 3/04815 345/419 |
| 8,542,196 B2 | 9/2013 | Pallakoff |
| 8,619,052 B2 | 12/2013 | Benko et al. |
| 8,674,943 B2 | 3/2014 | Westerman et al. |
| 2008/0042994 A1 | 2/2008 | Gillespie et al. |
| 2009/0122018 A1 | 5/2009 | Vymenets et al. |
| 2009/0135162 A1 | 5/2009 | Van De Wijdeven et al. |
| 2009/0207144 A1 | 8/2009 | Bridger |

(Continued)

FOREIGN PATENT DOCUMENTS

WO   2014084876 A2   6/2014

OTHER PUBLICATIONS

Ki-Uk Kyung, Jun-Young Lee, and M.A. Srinivasan, Precise manipulation of GUI on a touch screen with haptic cues, EuroHaptics conference, 2009 and Symposium on Haptic Interfaces for Virtual Environment and Teleoperator Systems, World Haptics 2009, Third Joint. 2009, 202-207, available online at http://hdl.handle.net/1721.1/59515.

(Continued)

Primary Examiner — Muhammad N Edun
(74) Attorney, Agent, or Firm — Clocktower Law; Erik J. Heels; Michael A. Bartley

(57) ABSTRACT

The precise touchscreen control allows a user to rapidly choose a point on a touchscreen, confirm that they've touched the point they intended, then perform a pan gesture to a new location, all without their fingertip obscuring any fine details on the screen.

15 Claims, 8 Drawing Sheets

(56) References Cited

U.S. PATENT DOCUMENTS

| | | |
|---|---|---|
| 2010/0328232 A1 | 12/2010 | Wood |
| 2011/0239153 A1 | 9/2011 | Carter et al. |
| 2012/0124515 A1 | 5/2012 | Li et al. |
| 2012/0242581 A1 | 9/2012 | Laubach |
| 2013/0335333 A1 | 12/2013 | Kukulski et al. |
| 2014/0278419 A1 | 9/2014 | Bishop et al. |
| 2014/0372939 A1* | 12/2014 | Parker .................. G06F 3/0481 715/799 |
| 2016/0357368 A1* | 12/2016 | Federighi .............. G06F 3/0483 |

OTHER PUBLICATIONS

Andrew Sears, Improving Touchscreen Keyboards: Design issues and a comparison with other devices, Interacting with Computers 3(3), 253-269, Dec. 1991, United Kingdom.

Anne Roudaut, Stephane Huot, Eric Lecolinet, TapTap and MagStick: Improving One-Handed Target Acquisition on Small Touch-screens, 9th International Working Conference on Advanced Visual Interfaces (2008) 146-153, available online at http://biblio.telecom-paristech.fr/cgi-bin/download.cgi?id=8002.

* cited by examiner

TOUCHSCREEN PRECISE POINTING GESTURE

CROSS-REFERENCE TO RELATED APPLICATIONS

This utility patent application claims priority from U.S. provisional patent application Ser. No. 62/338,607, filed May 19, 2016, titled "Touchscreen Precise Pointing Gesture" naming inventors Michael Morton, Andrew John Morris, and Rammohan Vangapalli.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2017 Onshape Inc.

BACKGROUND

Field of Technology

This disclosure relates to graphical user interfaces in computer software, and more specifically to any piece of software that requires touch gestures specifying precise points on a device's screen.

Background

In many user interactions with a touch screen, precision doesn't matter. Either the user is aiming for a hard-to-miss target (such as a button) or is touching the screen only to scroll in one or both dimensions (in this case, the touch location doesn't matter—only how much they move after they touch).

In certain other applications, however, the user is trying to start their finger at, or move it to, a precise point. This is inherently difficult, since humans have opaque fingers, and users can't see the portion of the screen under their fingertip(s).

Prior attempts to address this problem include:

Magnifiers show a copy of what's directly under the fingertip, near the finger but not under it. The copy need not be magnified, so this is a misnomer in some cases. The display of the copy clarifies what is under the finger, but blocks other parts of the display in the region where the copy is shown.

Software pointers display a pointer on the screen, with the blunt end of the pointer "anchored" to the user's fingertip. This allows precise selection, but encounters problems near edges of a touchscreen where the pointer length and/or angle may need to alter to allow selection, and also block or obfuscate display under the visible path of the pointer.

Hardware styluses use a commercial or other stylus with a fine point, minimizing blockage by being smaller than a finger but requiring the stylus.

DESCRIPTION OF PRIOR ART

U.S. Pat. App. Pub. No. 2011/0239153 "POINTER TOOL WITH TOUCH-ENABLED PRECISE PLACEMENT" (Cater et al., Sep. 29, 2011) discloses, in the Abstract, "A pointer tool in a touch-screen display is disclosed. The method includes activating a pointer tool in a touch screen display in response to contact with an area of the touch screen and persisting the displaying of the pointer tool in the touch screen display after the contact with the touch screen is removed. Once editing data is received, the pointer tool is removed from the touch screen display."

TapTap and MagStick: Improving One-Handed Target Acquisition on Small Touch-screens (Roudaut, Huot, and Lecolinet, AVI'08, the 9th International Working Conference on Advanced Visual Interfaces (2008) 146-153) discloses, in the Abstract, "We present the design and evaluation of TapTap and MagStick, two thumb interaction techniques for target acquisition on mobile devices with small touch-screens. These two techniques address all the issues raised by the selection of targets with the thumb on small tactile screens: screen accessibility, visual occlusion and accuracy. A controlled experiment shows that TapTap and MagStick allow the selection of targets in all areas of the screen in a fast and accurate way. They were found to be faster than four previous techniques except Direct Touch which, although faster, is too error prone. They also provided the best error rate of all tested techniques. Finally the paper also provides a comprehensive study of various techniques for thumb based touch-screen target selection."

None of the above provide a touchscreen control to avoid obscuring under a finger touch and including confirmation of an initial selection, dynamic establishment of an offset, and precise positioning while keeping the established offset fixed. What is needed, therefore, is a control that overcomes the above-mentioned limitations and that includes the features enumerated above.

BRIEF SUMMARY

The solution is a touch screen selection and movement control to select based on initial touch but then establish an offset before any movement, allowing visibility of any movement destination as well as cancelation without movement if the initial selection is incorrect. These features are enabled through:

1. A hotspot selection or activation point where a user touches a screen. This hotspot may be signified by a shape or region display, such as a cross, or visible object selection, such as highlighting an on-screen object at the selection point.
2. A border region, for example a circle, creating a border space around the hotspot. The border region may also have different sizes in different directions, such as with an oval or starfish shape.
3. Any finger movement within the border region has no effect on the hotspot selection point. This allows finger movement to verify (visibly confirm) the selection is correct without actual movement of the selection.
4. Upon finger drag to an edge point (exit point) of the border region, an offset vector (distance and direction) is established between that exit point and the hotspot, and any continued finger movement moves the selection (or selection point) relative to the finger movement while maintaining the same offset. This allows movement of the selection visually unimpeded by the controlling finger.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Terminology

Figure 1:
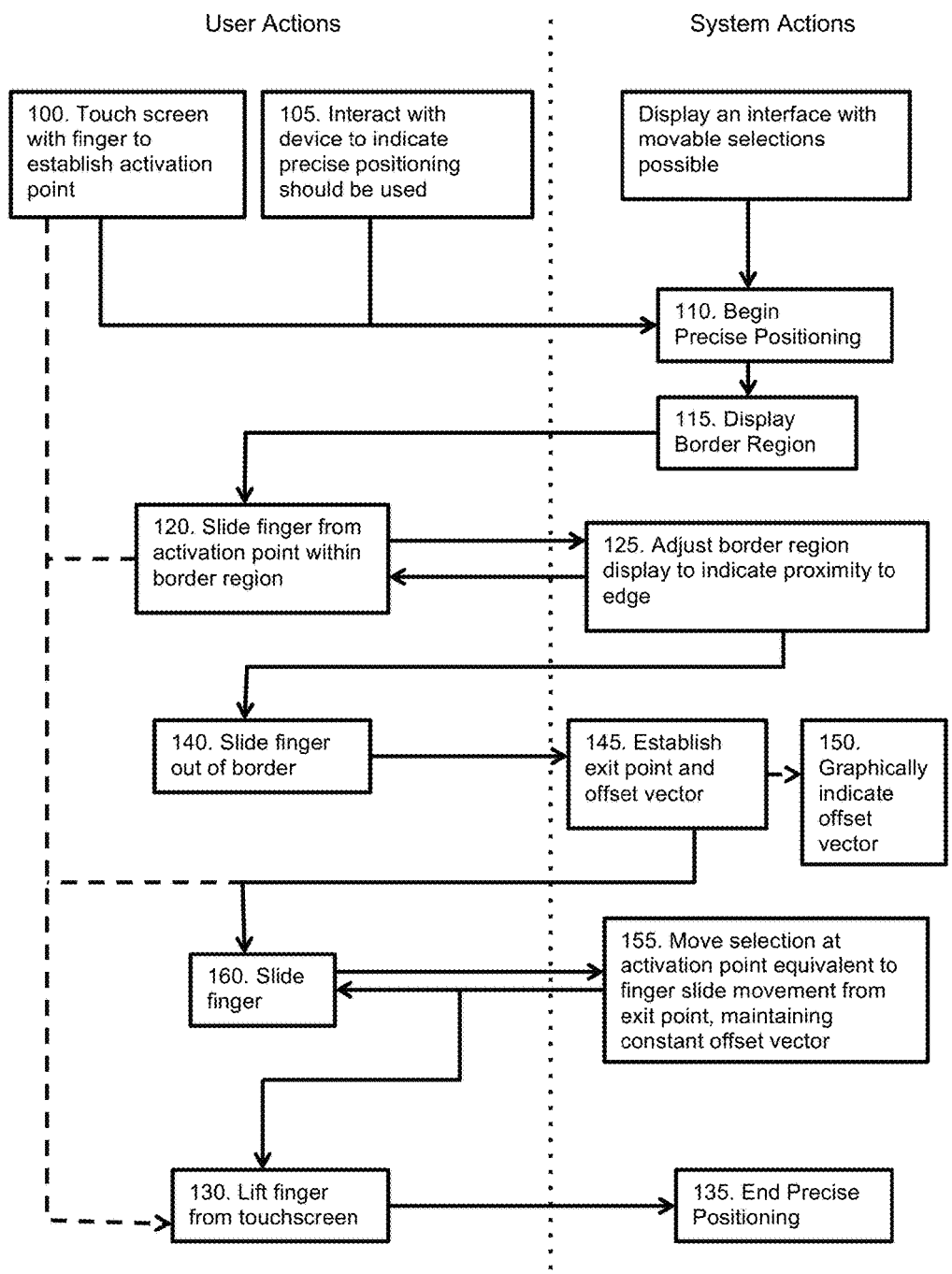
FIG. 1 is a flowchart of the precise positioning process.

The terminology and definitions of the prior art are not necessarily consistent with the terminology and definitions of the current invention. Where there is a conflict, the following definitions apply.

Activation point—the location on a touchscreen where a touch event begins. The activation point is used for selection control during precise positioning.

Border region—a shape around an activation point during establishment of precise positioning control event. Finger-slide movement within the border region will not change or move any item selected at an activation point until an exit point is established. After an exit point is established, the border region has no further effect during that precise positioning event.

Exit point—the location on the edge of a border region where a finger slides while activating a precise positioning control. The exit point to activation point vector establishes an offset of fixed distance and relative position for controlled movement of anything selected at the activation point during precise positioning.

Interface—graphical output of a computer system or individual program on a physical display, having elements for user selection or interaction through input devices, which may include the physical display if a touchscreen display.

Movable Element—any visually displayed entity or portion within an interface capable of being selected and moved by a user independently from other objects displayed within the interface.

Offset Vector—a direction and distance between a location of touch and a selected movable element being moved during precise positioning.

Precise positioning control event—a touch-control event for moving a selection on a touchscreen display interface which may be obscured by normal touch-control. The precise positioning control event begins after an initial touch of a touch event at an activation point and an additional indication that precise positioning control is desired (which may occur simultaneously or separately), and ends when the touch event ends.

Touch event—system detected contact on a touchscreen, usually by a finger or touch screen stylus. A touch event includes an initial location, a current location, and may include detected pressure. The touch event ends when the contact with the touchscreen ends.

Touchscreen display—an input/output device built into or otherwise connected to a computer device, having an electronic visual display screen capable of displaying visual video, image, or text, and detecting contact and location of one or more fingers or contact devices such as a stylus touching the screen.

Operation

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present invention.

Users interacting with a software application using a touchscreen sometimes want to use their fingertip to point to a precise position for selection or control on the screen. This is frequently done with mobile computing devices, such as a phones or tablets, but can be with any computer device using a touch screen display. Precise positioning can be desirable in many different situations, but is frequently needed when selecting objects or positions smaller than the size of a finger. In such scenarios, the finger used for selection or control obscures view of the desired target, creating a need for more precise position selection.

The user interacts with the touchscreen to indicate or activate precise positioning. Some example methods which may be used for such indication include, but are not limited to:

the user touches a spot on the screen, such as a dedicated button, before or after touching to establish an activation point the user touches the screen to establish an activation point and then makes a specific gesture, such as a pre-configured multi-touch or specific finger movement pattern the user touches the screen to establish an activation point and then holds the touch in a fixed position for a pre-configured duration the user touches the screen to establish an activation point and then uses a non-touch command, such as shaking or movement of the touch screen device, or a voice command automatically enabled for any touch control (preferably application-specific)

These activation controls may be configured at a system level (such as a system setting in the operating system running on the device) or at an application level (within an application running on the operating system running on the device), and may be pre-configured and fixed or dynamically configurable by any user or restricted to configuration by an authorized user. Each indication method is also associated with an initial user touch to establish an activation point.

During operation of precise positioning, a computer processor of the device operates software code to identify the activation point, select any object or element capable of movement at the activation point, track finger movement touching the screen, and calculate movement and offsets from the activation point along with any graphical display updates. The software may be part of a running application or part of an operating system stored and run on the device.

Figure 2:
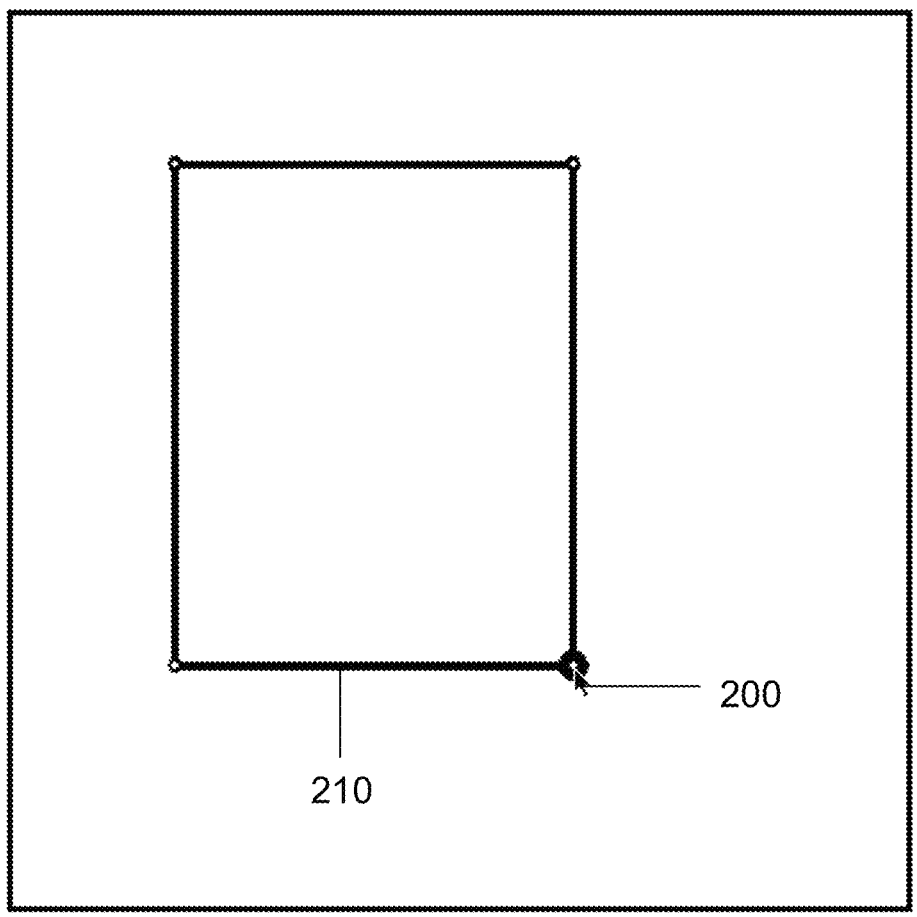
FIG. 2 shows an example touchscreen device interface.

Referring to FIGS. 1 and 2, a user makes an initial touch 100 at the specific point on the screen. As shown in the figure, the touch is at the corner of a box 210. Pointer arrow 200 represents the center point of a user's finger. With receipt of indication 105 from the user that precise positioning is desired, the position of the initial touch is the activation point for precise positioning.

Figure 3:
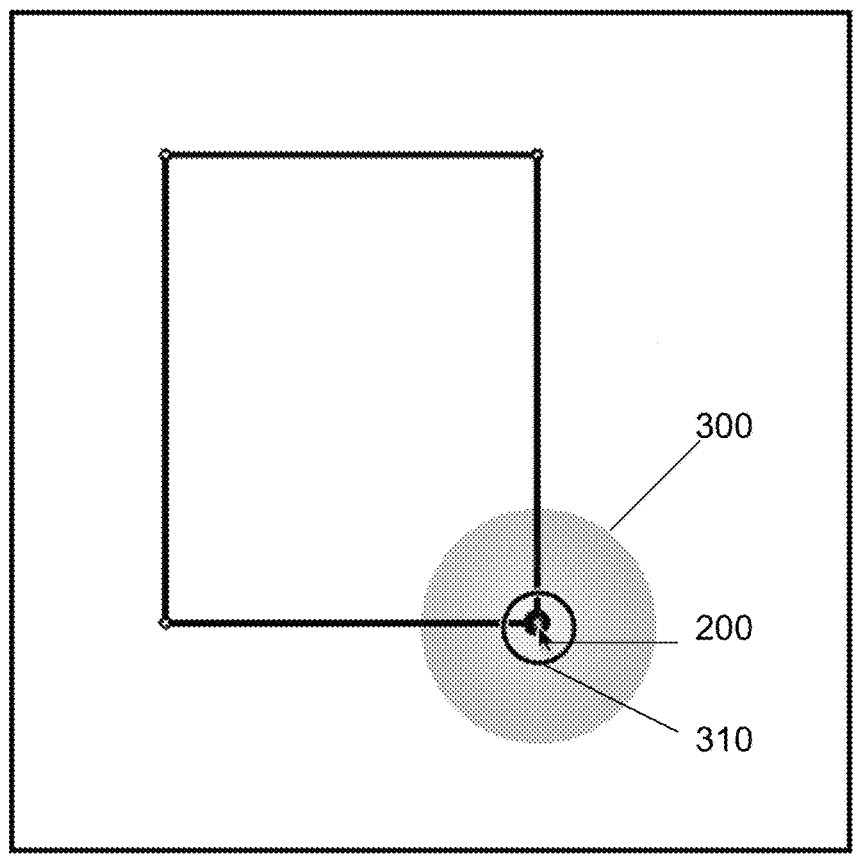
FIG. 3 shows the example touchscreen device interface as a user touch event begins.

Referring also to FIG. 3, with precise positioning activated 110 the display changes to display 115 border region 300 visually indicating that the user should establish an offset from the activation point. Pointer arrow 200 represents the center point of the user's finger, and circle 310 represents the entire touch area of finger, effectively blocking view of anything within circle 310. Border region 300 includes a circular ring with a gradient diminishing towards the activation point. Alternative border region indications are possible, and may include, but are not limited to:
- displaying an arrow pointing to the activation point from the current finger position
- displaying a crosshair or similar shape centered on the activation point
- displaying a shape such as a hollow circle, centered on the activation point
- displaying any other empty shape, or an empty shape with a partially transparent center, centered on the activation point.

Figure 4:
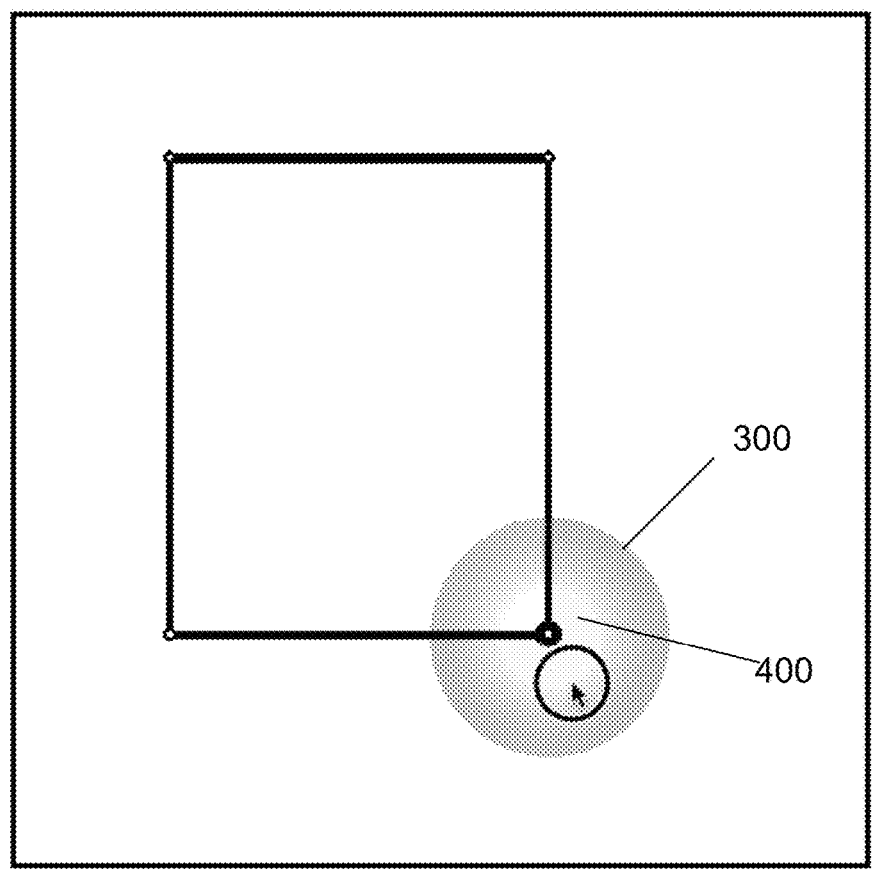
FIG. 4 shows the example touchscreen device interface after the user touch event begins during establishment of an offset selection with finger movement away from an initial touch point.
Figure 5:
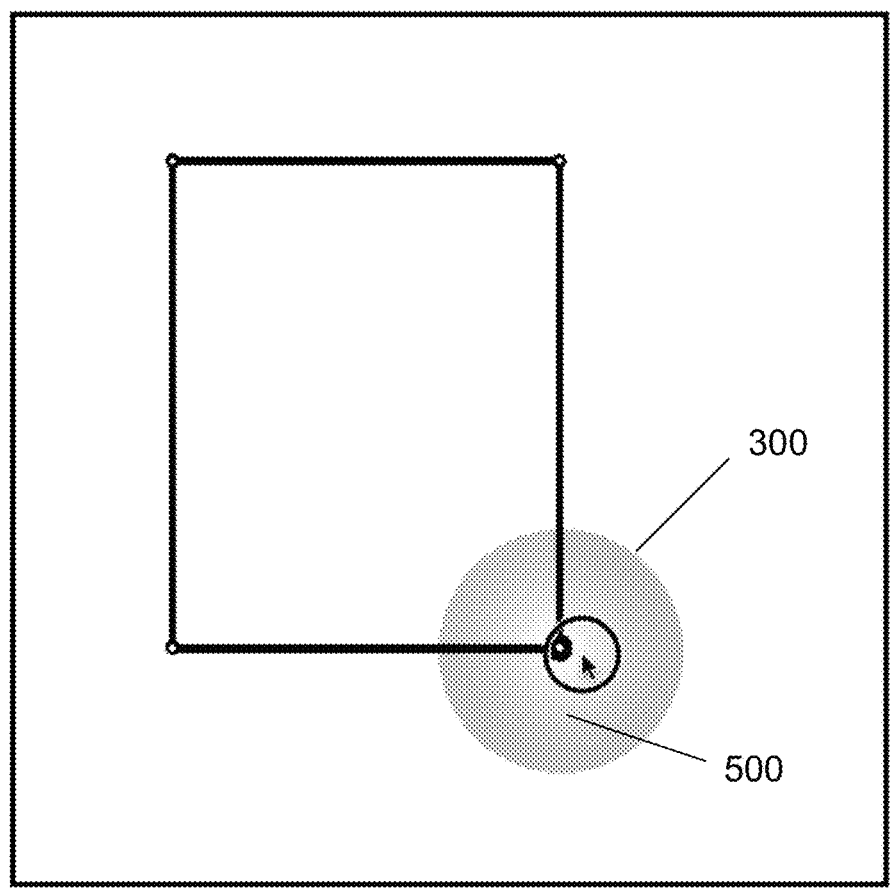
FIG. 5 shows a continuation of FIG. 3 with finger movement back towards the initial touch point.

After precise positioning is activated, the user moves 120 their finger. Referring to FIGS. 4 and 5, border region 300 may change 125 to provide visual indication, such as reducing gradient fill 400 in the center when moving toward the edge (FIG. 4) and increasing gradient fill 500 in the center when moving towards the activation point (FIG. 5). The visual indication may be a configurable display hinting that reaching the edge of the border region will have effect. For example, the border region may fade to transparent as the finger approaches the edge, as a hint that it will disappear entirely when the edge is reached. Alternatively, a visible pointer may display between the fingertip and the original point it touched (equivalent to an offset vector once the edge is reached), with the pointer fading to transparent as the finger gets near the edge, indicating that "mouse arrow" functionality is there even with the pointer is no longer visible. The timing and degree of transparency of the pointer and offset arrow may also be a configurable property. Some users may prefer a visible arrow, while other do not, and others may appreciate the visible arrow during initial use of precise positioning and invisible after a learning period has completed.

Figure 6:
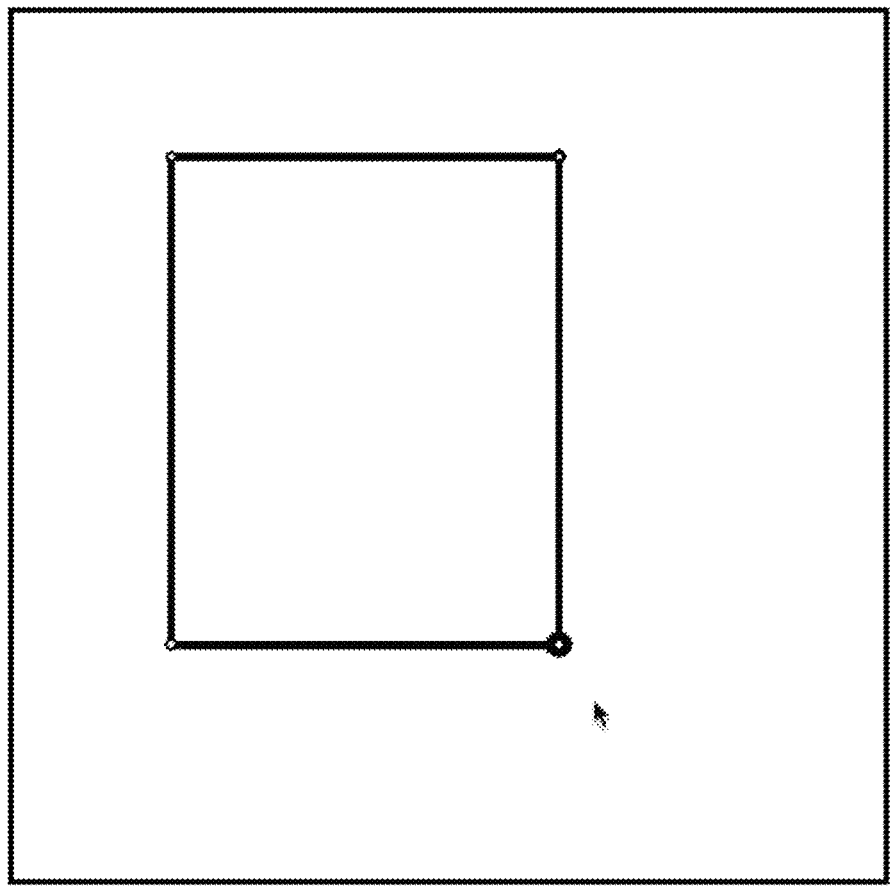
FIG. 6 shows the example touchscreen device interface after the user ends the touch event before establishing an offset selection.

Referring also to FIG. 6, lifting 130 the finger ends 135 precise positioning, and display of the border region ceases. This may be particularly useful if the desired target was not selected by the activation point, which may be revealed during finger movement within the border region. Any border region shape with one or more elongated lobes (e.g., a starfish) particularly serves this purpose. For example, a shape such as an elongated oval allows the user to move quickly to a nearby edge of the oval to lock in selection, but also gives room to move into a lobe of the oval without locking in to first confirm selection if desired. To restart precision pointing after canceling, the user may initiate again as described above. Alternatively, there may be a "selection correction delay" of a pre-configured interval (for example, 5 seconds) during which any next touch is treated automatically as activating precision pointing. This allows rapid re-selection with precise positioning without having to re-signal activation.

Figure 7:
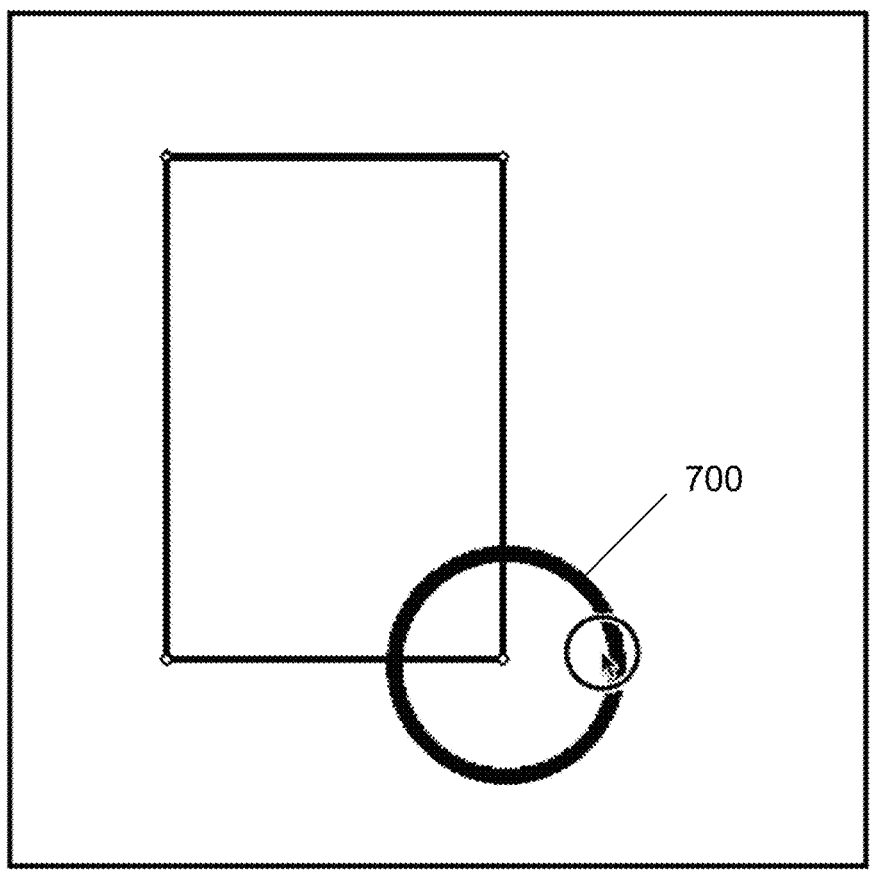
FIG. 7 shows the example touchscreen device interface during the user touch event with an offset selection established.

Referring also to FIG. 7, if the finger reaches 140 edge 700 of the border region, an exit point is established at the point where the edge is reached. At this point, an offset vector of distance and angle is established 145 between the exit point and activation point. Different graphical indication options may be used 150, such as, but not limited to, clearing the gradient fill in the border region, changing an edge color of the border region, displaying an arrow equivalent to the offset vector, initially pointing from the exit point to the activation point, or any combination of graphical indications. The graphical indication signifies that precise positioning has switched into movement mode. During movement mode, any selection made at the activation mode is moved 155 by an amount equivalent to finger slide motion 160, remaining the offset vector away from the current finger touch position. This allows precise positioning unobscured by the finger controlling the touch. During movement mode, the graphical indication may continued to display (and move with finger slide motion) to indicate precise positioning is still active, or alternatively alter such as fading to partial transparency or fading completely to avoid any visual obstruction. In applications such as text movement, or other positioning movement between objects (such as a icon within a grid layout of icons), selection may "snap" to a closest position to the end of the offset vector rather than continuously moving with the finger movement.

Figure 8:
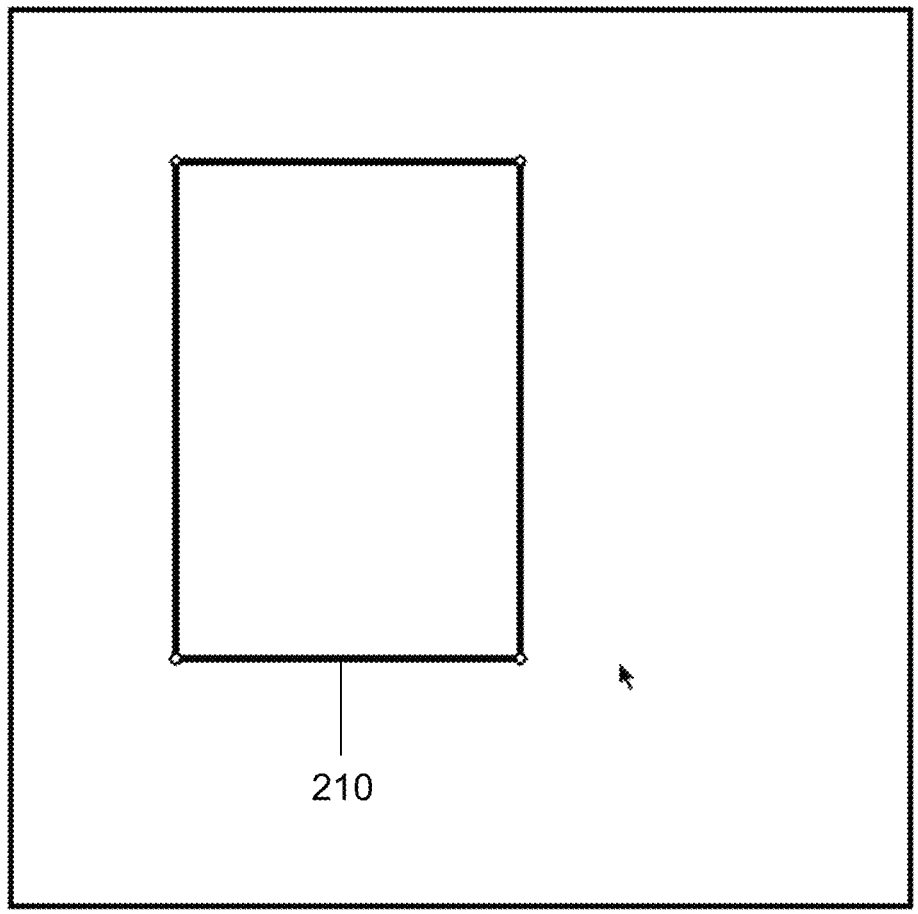
FIG. 8 shows the example touchscreen device after completion of the user touch event which used offset selection for dragging.

Referring also to FIG. 8, when the user lifts 130 the finger during movement mode, precise positioning ends with the selection at its moved position. In the illustrated example, the corner of box 210 has been moved to the left, with finger control for movement offset to the right.

Other Embodiments

The invention may be written in any of several widely available programming languages, and may be coded as a subroutine, module, subsystem, or object depending on the language and environment. In a server-client architecture it may be implemented on the server or client or any combination.

In an alternate embodiment, the display within the shape may be magnified for more precise selection. The magnification may be by a fixed amount, vary with the speed of finger movement, or be controlled by another function such as a concurrent multi-touch gesture. Magnification may be used as a "lock-in" selection mode, and toggled on/off, where while magnified the selection point may be moved without lifting the touch to restart precise positioning.

In another alternative embodiment, precise positioning may operate as part of any multitouch gesture, with each finger operating independently, and some or all of fingers able to switch to precision positioning mode.

In another alternative embodiment, once the finger reaches the edge of the border region, a slight amount of movement is allowed before locking in the selection and offset arrow. This hysteresis allows the user to select the original point if the whole point of the operation was selection. The hysteresis amount may be indicated by the thickness of the ring.

In another alternative embodiment, the border region is used only to confirm the selection was correct, and not to move the selection. In such case, lifting a finger from touching the device while outside of the shape confirms selection, while lifting the finger from inside the shape (independent of whether the shape border has been crossed) cancels selection.

In another alternative embodiment, selection confirmation requires a multi-finger action, such as tapping a second finger. This allows adjusting the activation point without canceling and restarting precise positioning. After confirmation, finger movement to the edge of the border region establishes the offset pointer for dragging.

In another embodiment, the border region may include markings to indicate selection of an angle. For example, there may be tickmarks every 90° (or other configured angle) inside a ring. As your finger moves, the crosshairs rotate, presenting as a free-rotating ring.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of precise positioning comprising:
displaying an interface with selectable and movable elements on a touchscreen display of a computer device;
detecting an initial touch of a finger or stylus at a location within the interface on the touchscreen display;
tracking an activation point at the location of the initial touch;
selecting a movable element within the interface at the activation point;
receiving user indication for precise positioning;
displaying a border region around the activation point;
identifying an exit point on an edge of the border region when the finger or stylus slides through and out of the border region;
determining an offset vector of distance and direction from the exit point to the activation point;
moving the selected movable element with further slide movement of the finger or stylus, keeping the selected element positioned the offset vector away from a current touch position of the finger or stylus; and
ending precise position when the finger or stylus is lifted from the touchscreen.

2. The method of claim 1, wherein receiving user indication comprises a user touch of a dedicated spot on the touchscreen display before or after the initial touch.

3. The method of claim 1, wherein receiving user indication comprises a multi-finger touch or specific finger gesture movement after the initial touch.

4. The method of claim 1, wherein receiving user indication comprises the user holding the initial touch without movement for a preconfigured duration.

5. The method of claim 1, wherein receiving user indication comprises a non-touch command of moving the touchscreen display or giving a voice command.

6. The method of claim 1, wherein receiving user indication is automatically triggered by a specific operating application.

7. The method of claim 1, wherein displaying the border region further comprises displaying an arrow pointing to the activation point from the current touch position.

8. The method of claim 1, wherein displaying the border region further comprises displaying a cross-hair centered on the activation point.

9. The method of claim 1, wherein displaying the border region further comprises displaying an empty shape centered on the activation point.

10. The method of claim 1, wherein displaying the border region further comprises displaying a shape around the activation point having different sizes in different directions.

11. The method of claim 1, further comprising displaying visual indication of touch movement within the border regions.

12. The method of claim 11, wherein visual indication is a gradient fill of the border region such that gradient fill is reduced around the activation point when the current touch position moves towards the edge of the border region, and gradient fill is increased around the activation point when the current touch position moves towards the activation point.

13. The method of claim 11, wherein visual indication is a fade to transparent of the border region as the current touch point approaches the edge of the border region.

14. The method of claim 1, further comprising displaying the offset vector between the current touch point and activation point.

15. The method of claim 1, further comprising lifting the finger or stylus within the border region, detecting a second touch by the finger or stylus within a preconfigured time period of lifting, resetting the activation point at the location of the second touch, and treating the second touch as user indication for precise positioning.

* * * * *